(12) United States Patent
Huang

(10) Patent No.: US 6,290,158 B1
(45) Date of Patent: Sep. 18, 2001

(54) REEL DEVICE CARRIED ON ONE'S PERSON

(76) Inventor: Yuh-Lin Huang, No. 5, Alley 2, Lane 85, Min-Tsu Road, Lu-Chou, Taipei Hsien (TW)

(*) Notice: Subject to any disclaimer, the term of this patent is extended or adjusted under 35 U.S.C. 154(b) by 0 days.

(21) Appl. No.: 09/418,128

(22) Filed: Oct. 14, 1999

(51) Int. Cl.[7] .................................................. B65H 75/48
(52) U.S. Cl. ...................... 242/379; 242/379.2; 242/380; 242/404.3; 33/769
(58) Field of Search ................................ 242/379, 379.2, 242/402, 404.2, 404.3, 380; 33/761, 768, 769; 119/796

(56) References Cited

U.S. PATENT DOCUMENTS

| | | | |
|---|---|---|---|
| 721,460 | * | 2/1903 | McDougall ............................. 242/379 |
| 1,232,299 | * | 7/1917 | Hance .................................. 242/380 |
| 1,374,459 | * | 4/1921 | Lichty .................................. 242/379 |
| 1,567,783 | * | 12/1925 | Best ................................... 242/379.2 |
| 3,054,573 | * | 9/1962 | Spencer ................................ 242/379.2 |
| 3,547,371 | * | 12/1970 | Gruseck ............................... 242/379.2 |
| 3,672,597 | * | 6/1972 | Williamson ............................ 242/379 |
| 3,968,670 | * | 7/1976 | Quenot ................................. 242/379 |
| 4,286,387 | * | 9/1981 | Di Diege .............................. 242/404.3 |
| 4,662,078 | * | 5/1987 | Gammon et al. ........................ 33/768 |
| 5,079,851 | * | 1/1992 | Sill ..................................... 33/768 |
| 5,490,805 | * | 2/1996 | Bredesen .............................. 242/379 |
| 5,833,165 | * | 11/1998 | Paugh ................................. 242/379.2 |
| 5,938,137 | * | 8/1999 | Poulson .............................. 242/379.2 |

* cited by examiner

Primary Examiner—John M. Jillions
(74) Attorney, Agent, or Firm—Dougherty & Troxell

(57) ABSTRACT

A rotatable reel carried on one's person having a housing assembled from an upper lid and a bottom lid is disclosed. A male upper cover and a female lower cover are provided in the housing to form a reel axle to be placed therein a coil spring and a roll of pulling rope. One end of the rope is exposed to the exterior of the housing to connect with a clamp on the surface of the bottom lid. A slightly smaller lining sleeve is slipped in the upper lid, the bottom lid is slipped over the lining sleeve and abutted on a protruding portion provided on the lining sleeve for tight connecting with the upper lid. A rivet sleeve is extended through central holes of the bottom lid, the reel and the lining sleeve and is rivet fastened with its end to the lining sleeve. The upper lid is provided directly on the planar surface thereof with a hole for receiving a decorative piece, the hole can be formed by punching molding to have various shapes to give various decorative possibilities for the reel. Alternatively, the hole can be directly added with an elastomer pad sandwiched between the upper lid and the lining sleeve to function as a decorative piece. And the reel axle is formed by slipping of the male upper cover in the female lower cover, space for receiving the coil spring and the pulling rope can be enlarged. This allows convenient rotation within 360 degrees of the reel in pulling out a rope, besides, the end of the rope can be elastically reeled back to its proper position without frictional damage.

19 Claims, 14 Drawing Sheets

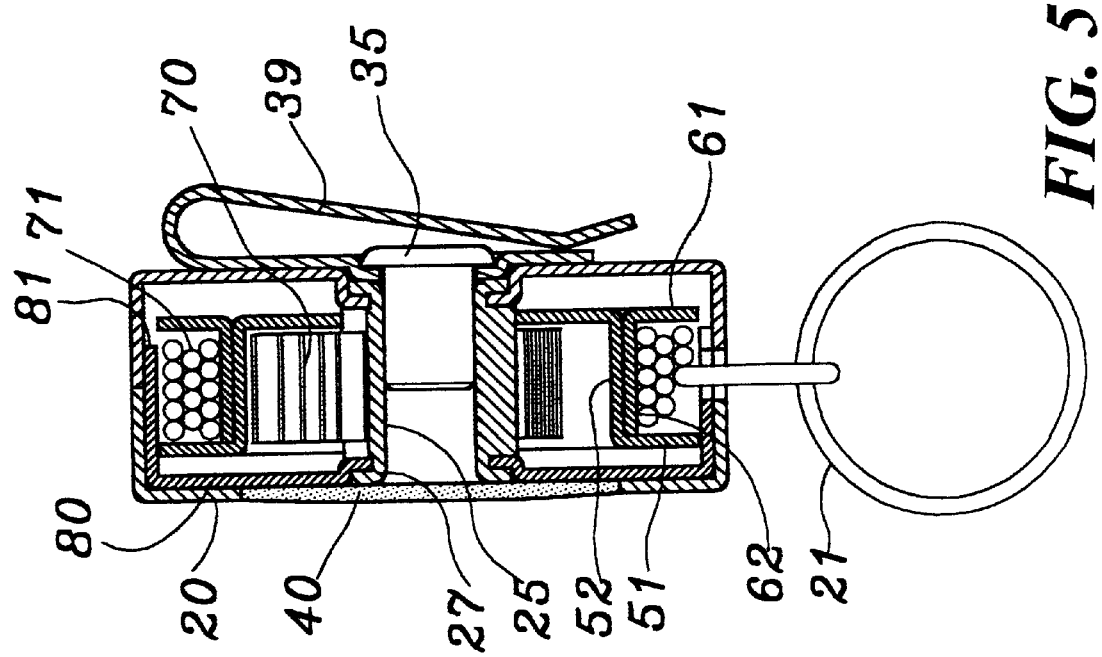
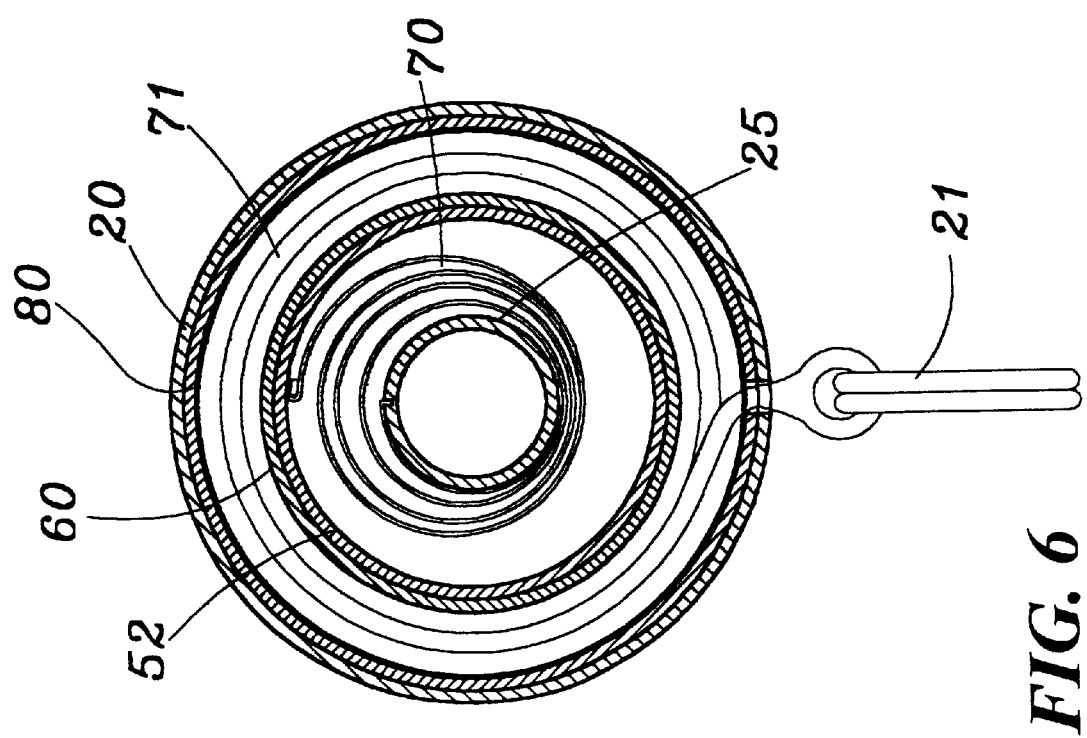

US 6,290,158 B1

REEL DEVICE CARRIED ON ONE'S PERSON

BACKGROUND OF THE INVENTION

1. Field of the Invention

The present invention is related to an improved reel device, especially to a reel device capable of tight connection with a decorative piece or various modeling decorations. The interior volume of the reel can be enlarged to allow convenient rotation of 360 degrees of the reel.

The reel involved in the present invention is especially suitable for carrying on the waist of a person, and can be used as a measuring tape, a stretchable key collecting device, or a belt device carried on one's person for taking a pet outdoors. Such a reel is provided centrally and internally with a coil spring and a rope or a measuring tape which can be pulled outwardly and can be reeled back by the internal coil spring when a pulling force is removed.

2. Description of the Prior Art

FIG. 1 shows an analytic structure of such a conventional reel; the main housing of the whole reel is comprised of an upper lid 11 and a bottom lid 12. The reel is further provided with a collar 13, an upper cover 14 and a lower cover 15 to form together a reel axle. The collar 13 is provided therein with a coil spring 16, the above mentioned members can be serially connected by means of a mandrel 17.

Among the conventional reels, the reel which reels and releases a rope and a coil spring is comprised of an upper cover 14 and a lower cover 15 and a collar 13. The covers 14 and 15 are provided respectively with spaced connecting holes 141, 151 at the periphery of the collar 13. The collar 13 is provided on both sides thereof with a plurality of insertion lugs 131, 132. The insertion lugs 131 on one side are inserted into the connecting holes 141 of the cover 14, while the insertion lugs 132 on the other side are inserted into the connecting holes 151 of the other cover 15. Then the insertion lugs 131, 132 are bent in position, and a reel axle is completed, the coil spring 16 can be placed within the covers 14 and 15 and in the interior 133 of the collar 13. The external peripheral surface 134 of the collar 13 is used for reeling thereon a pulling rope of desired length (not shown). The defect resided in such a conventional reel axle structure is that: the collar 13 must be of a size in pursuance of the diameter of the circles having the spaced connecting holes 141, 151 thereon of the covers 14 and 15 respectively, thereby the interior 133 of the collar 13 is limited and smaller. The collar 13 can not receive a larger coil spring 16, and the force for reeling back resiliently is smaller too. And more, the collar 13 must be provided with a plurality of insertion lugs 131, 132 of suitable length for assembling the covers 14 and 15, thereby the external peripheral surface 134 thereof for reeling and releasing a pulling rope is limited in width. In other words, the pulling rope can not be longer for measuring or pulling outwardly to a larger distance.

Moreover, the upper lid 11 must be provided with a central hole 111 for riveting an end 171 of the mandrel 17. And the central hole 111 must be punching molded to form therearound a concave annular area 112 for mounting on the exterior surface of the upper lid 11 a decorative piece (not shown). The concave annular area 112 for mounting the decorative piece can obscure the rivet connection to form a more beautiful exterior surface 113 on the upper lid 11 of the reel. However, the concave annular area 112 provided on the exterior surface 113 is lowered to a certain depth which includes two defects. One is that the die for forming the concave annular area 112 will make the concave annular area 112 an arciform section, and a slit may form when the decorative piece closes it to create a less even and less aesthetic external decorative piece. While the other defect is that, if modeling of the concave annular area 112 for mounting the decorative piece is to be changed, the cost of a new die required is too expensive and is uneconomic.

Further as shown in FIG. 2, the reel proper 10 can be provided on one side thereof with a clamp 18 fixedly or movably riveted on the end 171 of the mandrel 17. The clamp 18 is provided with a clamping mouth 181. An exposing pulling control member 19 can be fixed on one end of a pulling rope 101. The pulling rope 101 is extended through a central hole 191 provided in the top surface of the pulling control member 19 and is fixed in position by tying a knot. After the clamp 18 is clamped on a waist belt by the clamping mouth 181, if it is fixedly riveted on the end 171, the pulling control member 19 can only pull the pulling rope 101 out in a single direction; if it is movably riveted on the end 171, the whole reel 10 can be controlled by pulling in the whole circle taking the movable riveting point as an axis. But the movable axis is formed from a rivet; it is not smooth in rotating and is subjected to getting jammed.

The structure assembled from the pulling rope 101 and the pulling control member 19 makes the pulling rope 101 subjected to damage and breaking by rubbing due to the friction induced at the periphery of the central hole 191 provided in the top surface of the pulling control member 19. This is one of its defects. When pulling force is removed, the whole pulling rope 101 will be reeled back into the reel by a coil spring in the reel. However, such a conventional structure assembled from the pulling rope 101 and the pulling control member 19 cannot make the pulling control member 19 get back to its original position accurately and automatically.

SUMMARY OF THE INVENTION

The object of the present invention therefore is to provide a reel device portable with one's person. An upper lid of the reel device is provided therein with a lining sleeve which slightly protrudes for assembling with a bottom lid. A reel axle is provided between the reel device and the bottom lid; the reel axle is comprised of a male upper cover and a female lower cover. Wherein, the male upper cover is provided with a connecting bowl having a suitable diameter, while the female lower cover is correspondingly provided with a fitting-over collar matching with the connecting bowl. When the bowl and the collar are fittingly connected with each other, a larger space for reeling and releasing a coil spring and a pulling rope is formed therebetween. Thereby, reeling-back force of the reel portable with one's person and length of the pulling rope can be increased.

Another object of the present invention is to provide a reel device portable with one's person, wherein, the upper lid can be directly provided with a hole for a decorative piece. The hole can more tightly contact the decorative piece, so that the decorative piece can be gotten rid of non-elegant angular portions.

Another object of the present invention is to provide various modeling for the decorative piece on the upper lid in a more economic way.

A further object of the present invention is to provide directly a pad between the upper lid and the lining sleeve which is assembled with the upper lid. The pad can be used to directly form a decorative surface without providing an additional decorative piece.

In another preferred embodiment of the present invention, a clamp is provided on its connecting side with a protruding annulus having a hole therein and to be inserted into a corresponding concave portion provided on one side of the reel body. And a bolt is extended through the hole to lock with fittings in the reel body. The bolt is extended into the reel body and the clamp with its neck portion. The neck portion functions as an axis and can be rotated smoothly within 360 degrees. The pulling rope can be added on the end thereof with a ball which can be fitted in a pulling control member as a force bearing portion. Thereby, the assembly of the clamp and the reel body can be rotated conveniently in a whole circle, and the pulling control member can be pulled out in any direction with the pulling rope. And more, the pulling control member can be reeled back to its original position accurately without damaging the pulling rope by rubbing.

The present invention will be apparent in its objects and features after reading the detailed description of the preferred embodiment thereof in reference to the accompanying drawings.

BRIEF DESCRIPTION OF THE DRAWINGS

In the drawings:

FIG. 5 is a cross sectional view taken from FIG. 3;

FIG. 6 is a longitudinal sectional view taken from FIG. 3;

DETAILED DESCRIPTION OF THE PREFERRED EMBODIMENT

Figure 1:
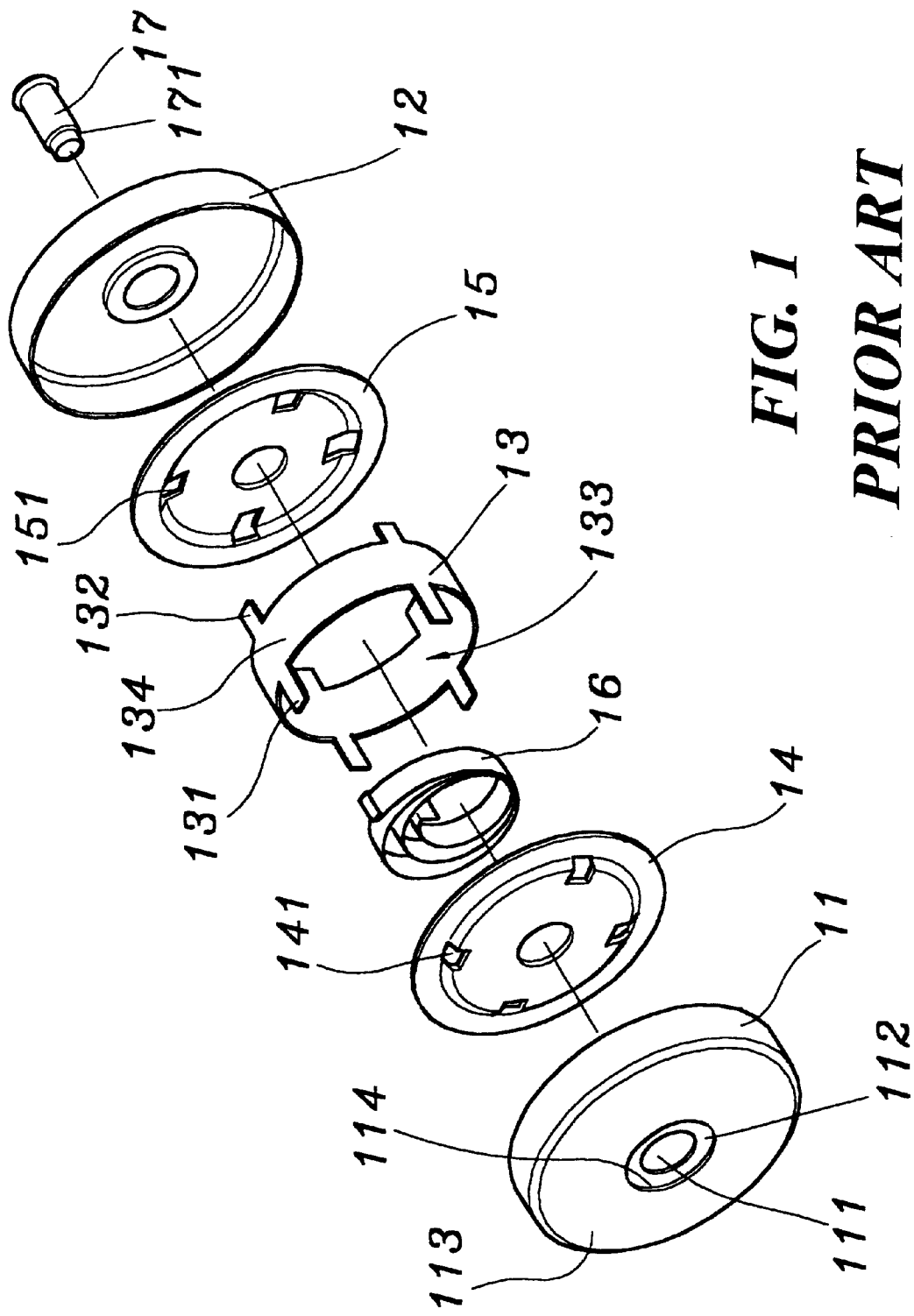
FIG. 1 is an analytic perspective view of a conventional reel portable with one's person.
Figure 2:
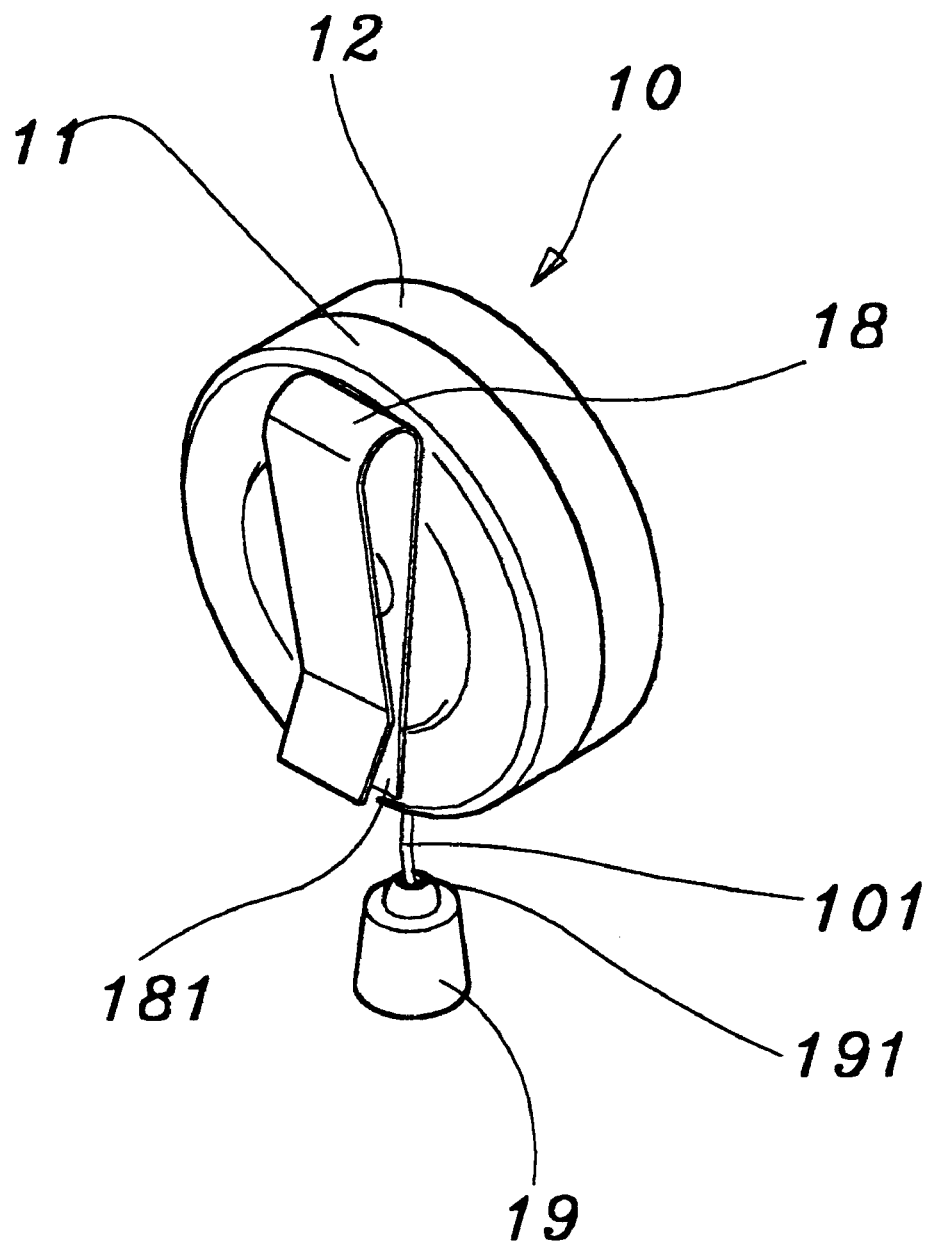
FIG. 2 is a perspective view showing a conventional reel provided with a clamp and a pulling control member.
Figure 3:
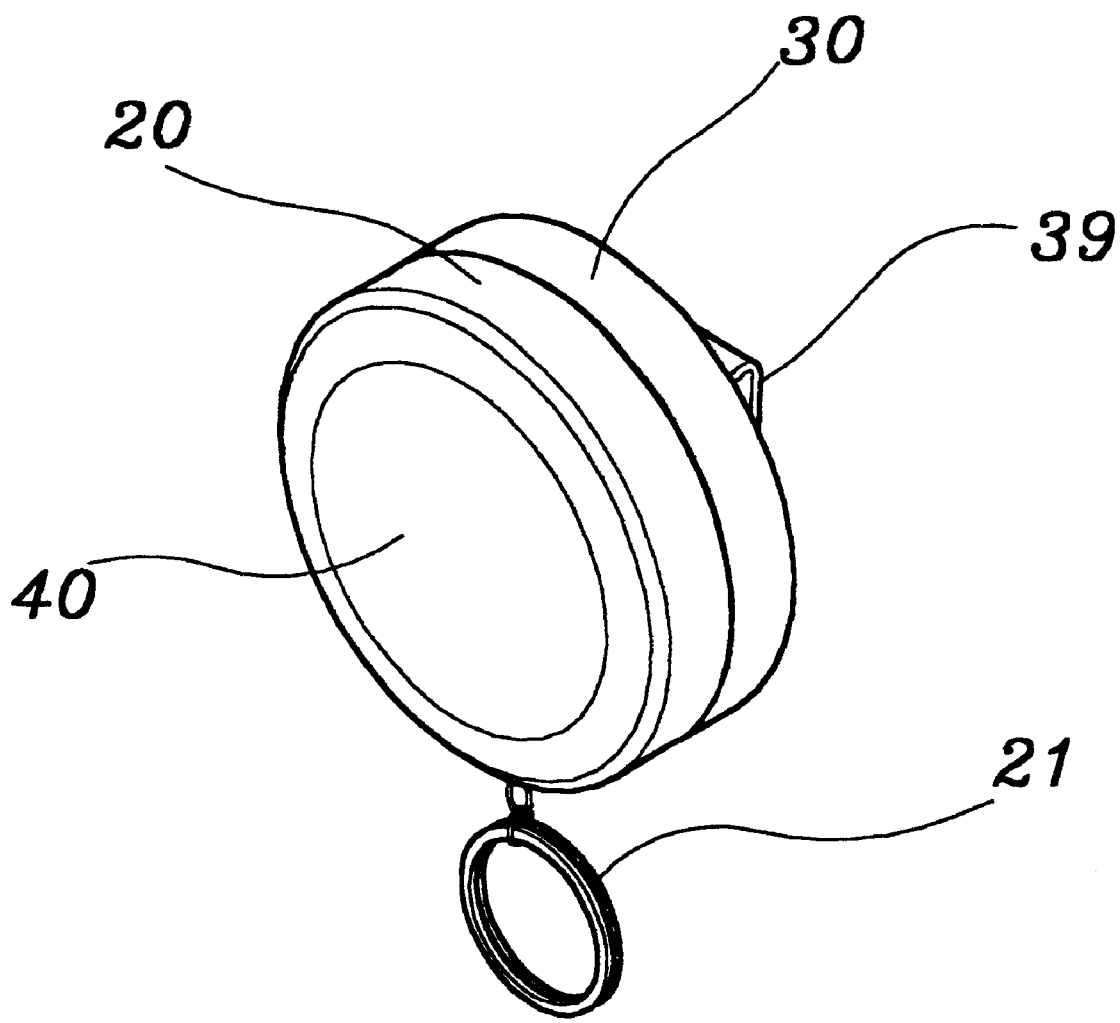
FIG. 3 is a perspective view showing an embodiment of the present invention.

Referring to FIG. 3, the external housing of the reel is comprised also of an upper lid 20 and a bottom lid 30, a pulling rope is provided on the periphery of the lids and is connected with an exposed pulling control member 21. The upper lid 20 can be mounted on the exterior surface thereof with a decorative piece 40, while the bottom lid 30 can be mounted on the exterior surface thereof with a clamp 39.

Figure 4:
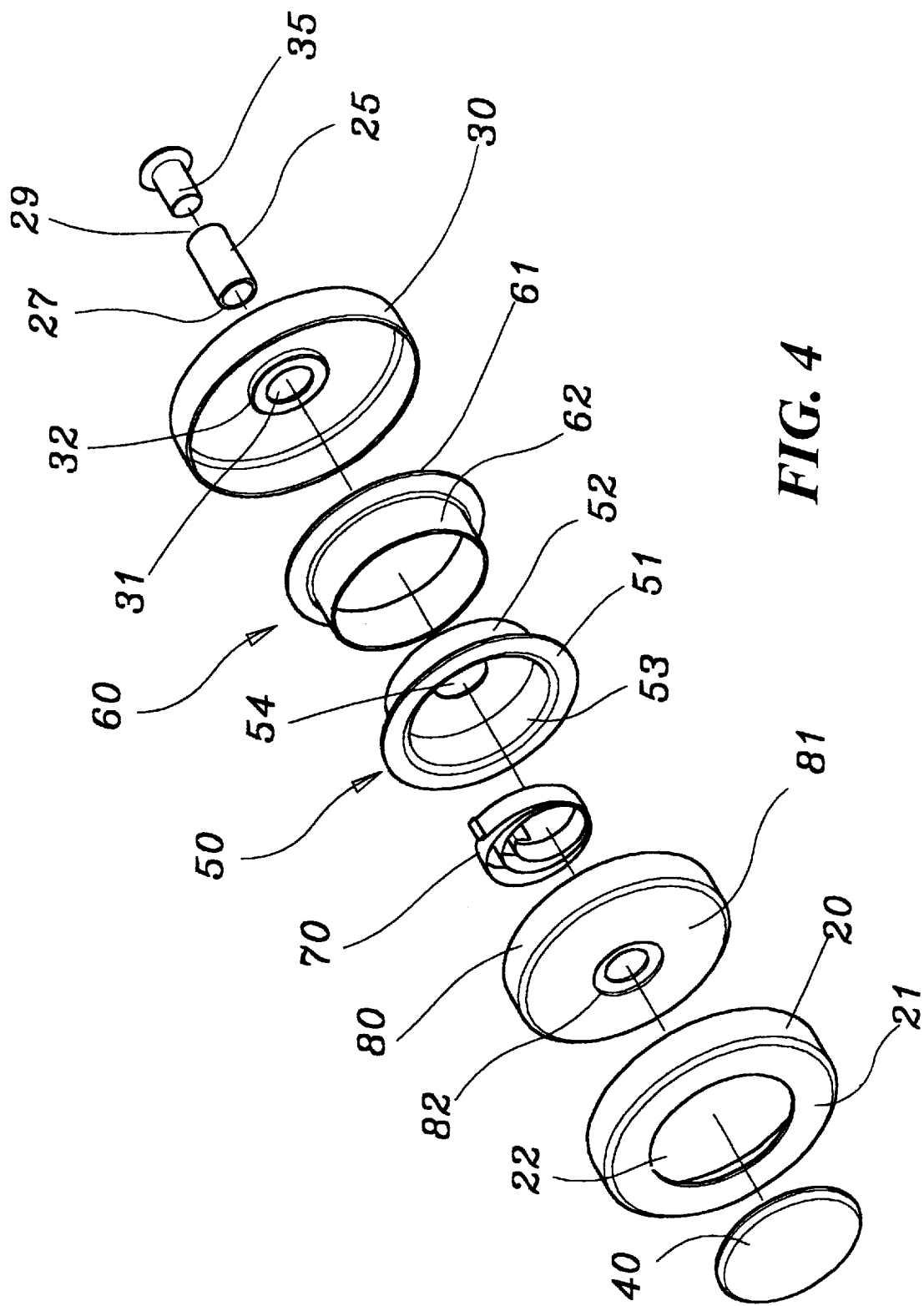
FIG. 4 is an analytic perspective view showing the main elements of the present invention.

As shown in FIG. 4, a male upper cover 50 and a female lower cover 60 are provided in the interior of the reel housing for forming a reel axle. The male upper cover 50 is provided with a peripheral upper ring 51 and a hollow connecting bowl 52 with a suitable diameter and with a central bottom hole 54, a receiving space 53 thereby is formed in the hollow connecting bowl 52. While the female lower cover 60 is correspondingly provided with a lower peripheral ring 61 and a fitting-over collar 62 tightly matching with the connecting bowl 52. When the bowl 52 and the collar 62 are fittingly connected with each other, a space in the male upper cover 50 can be placed therein a coil spring 70, and a pulling rope 71 is wrapped about the female lower cover 60 (referring to FIG. 5).

The upper lid 20 can be provided on its surface 21 with a hole 22 for receiving the decorative piece 40, and a lining sleeve 80 of a slightly smaller diameter can be slipped therein. The lining sleeve 80 has a slightly protruding portion 81 thereon. The bottom lid 30 having the same diameter as that of the upper lid 20 can be slipped over the lining sleeve 80 and abutted on the protruding portion 81 to complete the housing of the reel.

Referring to FIG. 4 and 5, a rivet sleeve 25 of suitable diameter is extended through a central hole 31 of the bottom lid 30. The reel axle formed from the male upper cover 50 and the female lower cover 60 and the lining sleeve 80 are put together and tightly serially connected. The rivet sleeve 25 is riveted with its end 27 being flush with a concave area 82 centrally of the lining sleeve 80. The other end 29 of the rivet sleeve 25 is used to movably rivet a clamp 39 with a rivet 35 at a concave area 32 surrounding the central hole 31 of the bottom lid 30. In this way, the whole reel can have its internal pulling rope 71 pulled out in a larger angular scope when it is hung on the waist of a person. When the rivet sleeve 25 is used to make serial connection, the coil spring 70 provided in the receiving space 53 of the male upper cover 50 is secured with one end thereof on the rivet sleeve 25 and with the other end thereof on the inner surface of the hollow connecting bowl 52 of the male upper cover 50 (referring to FIG. 6). The pulling rope 71 is wrapped about the fitting-over collar 62 of the female lower cover 60. The upper lid 20 integrally fitted tightly over the lining sleeve 80 can be mounted on the exterior surface thereof with the decorative piece 40.

Figure 7:
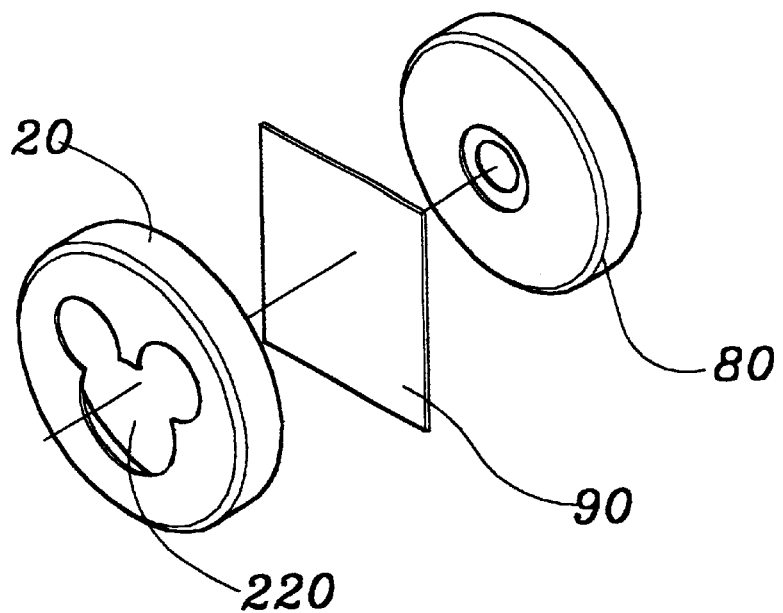
FIG. 7 is a schematic view showing an upper lid and a lining sleeve with a pad therebetween of another embodiment of the present invention.
Figure 8:
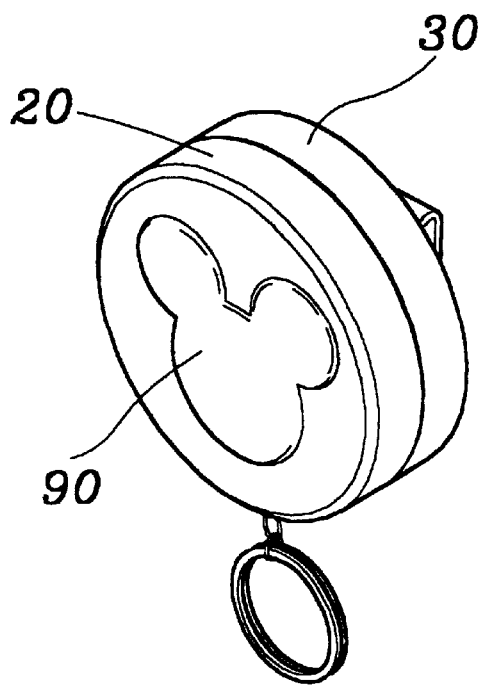
FIG. 8 is a perspective view of a whole reel as shown in FIG. 7 after assembling.

By virtue that the present invention has the surface of the upper lid 20 formed by punching the required hole 22 for receiving the decorative piece 40 directly, it is advantageous in getting rid of non elegant and non smooth joint without providing any concave annular area for receiving the decorative piece 40. Another advantage resides in that, since the hole 22 is provided for receiving the decorative piece 40 directly on the planar surface of the upper lid 20, it can be formed economically by punching to have various shapes to give various decorative possibilities for the surface of the whole reel. As shown in FIG. 7, a hole 220 of the shape of an animal is directly formed by punching on the upper lid 20 to be applied thereon a decorative piece of the same shape. More ideally, as shown in FIG. 7, the hole 220 of the shape of an animal can be directly added with an elastomer pad 90 which is sandwiched between the upper lid 20 and the lining sleeve 80 without applying thereon any decorative piece. So that when the upper lid 20 and the lining sleeve 80 are assembled, the pad 90 can show a desired decorative pattern.

And more, the interior reel axle is formed by slipping of the male upper cover 50 in the female lower cover 60 without leaving any insertion lug as in the case of the above mentioned conventional reel. Thereby, distance between the peripheral upper ring 51 and the lower peripheral ring 61 can be enlarged to increase the space for receiving the coil spring 70 and the internal pulling rope 71. In this way, reeling back force after using the reel and stretching distance of the pulling rope 71 for measuring can be increased.

Figure 9:
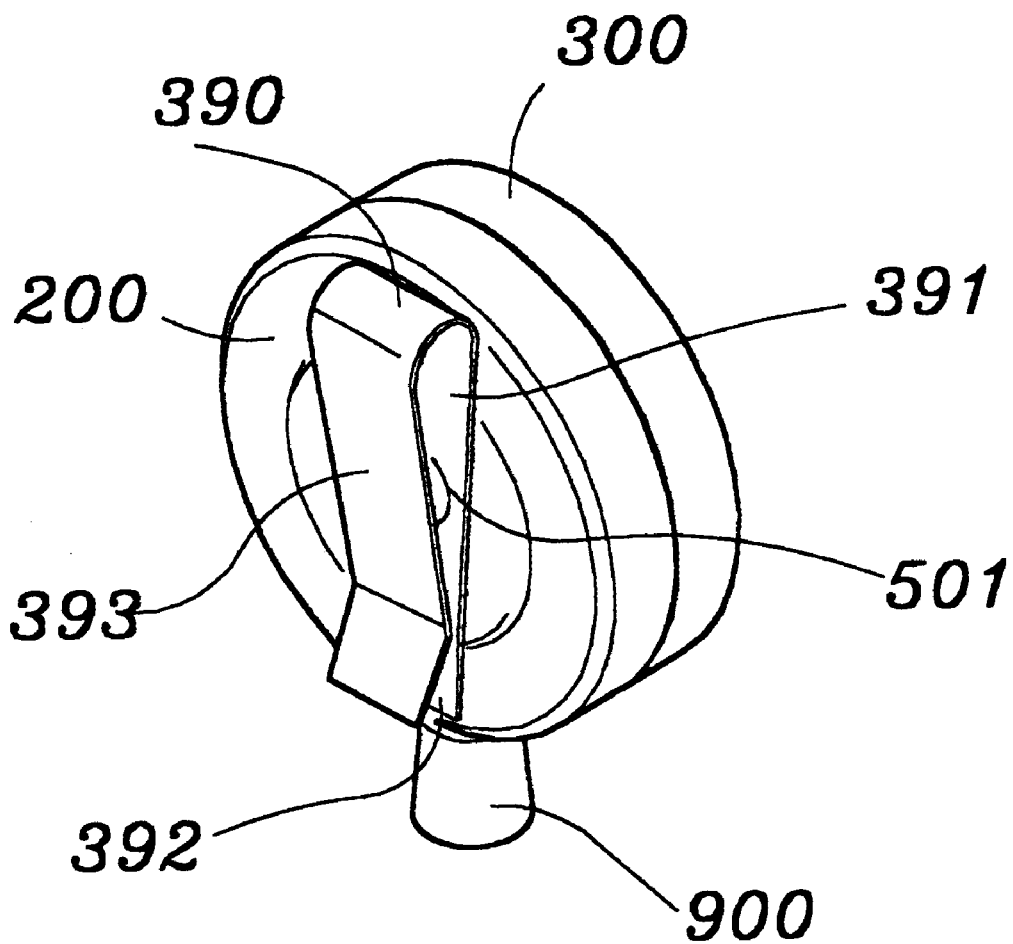
FIG. 9 is a perspective view showing another preferred embodiment of the present invention provided with a clamp and a pulling control member.
Figure 10:
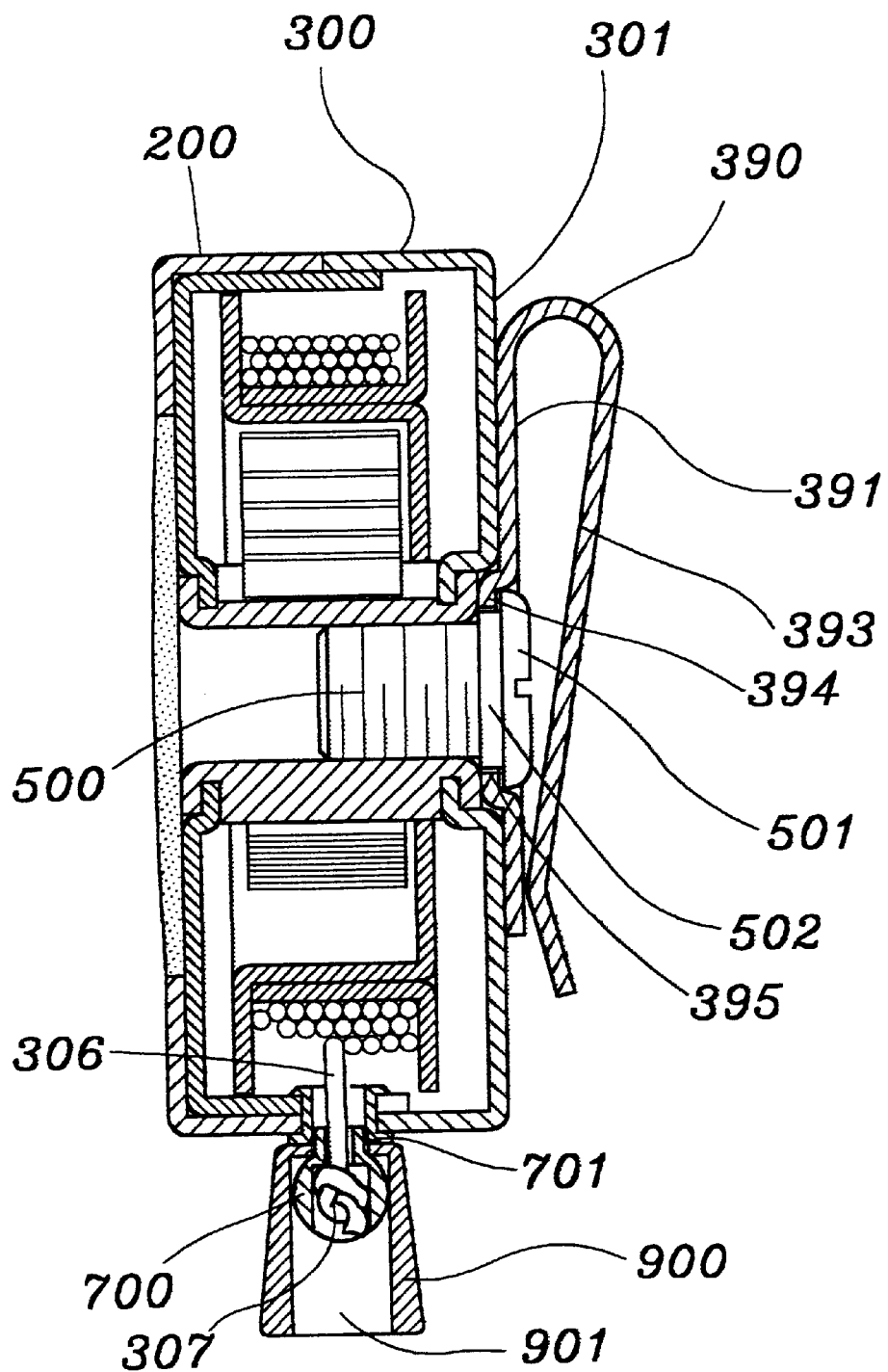
FIG. 10 is a cross sectional view taken from FIG. 9.

Referring to the preferred embodiment shown in FIG. 9 and 10, wherein, the reel body is also assembled from an upper lid 200 and a bottom lid 300 and is in the shape of a round disk. A clamp 390 is mounted on one side 301 of the bottom lid 300, and a pulling control member 900 of another type is provided at a suitable position on the periphery of the reel body. The clamp 390 and the pulling control member 900 are provided on the reel having the same internal structure as stated above.

Figure 11:
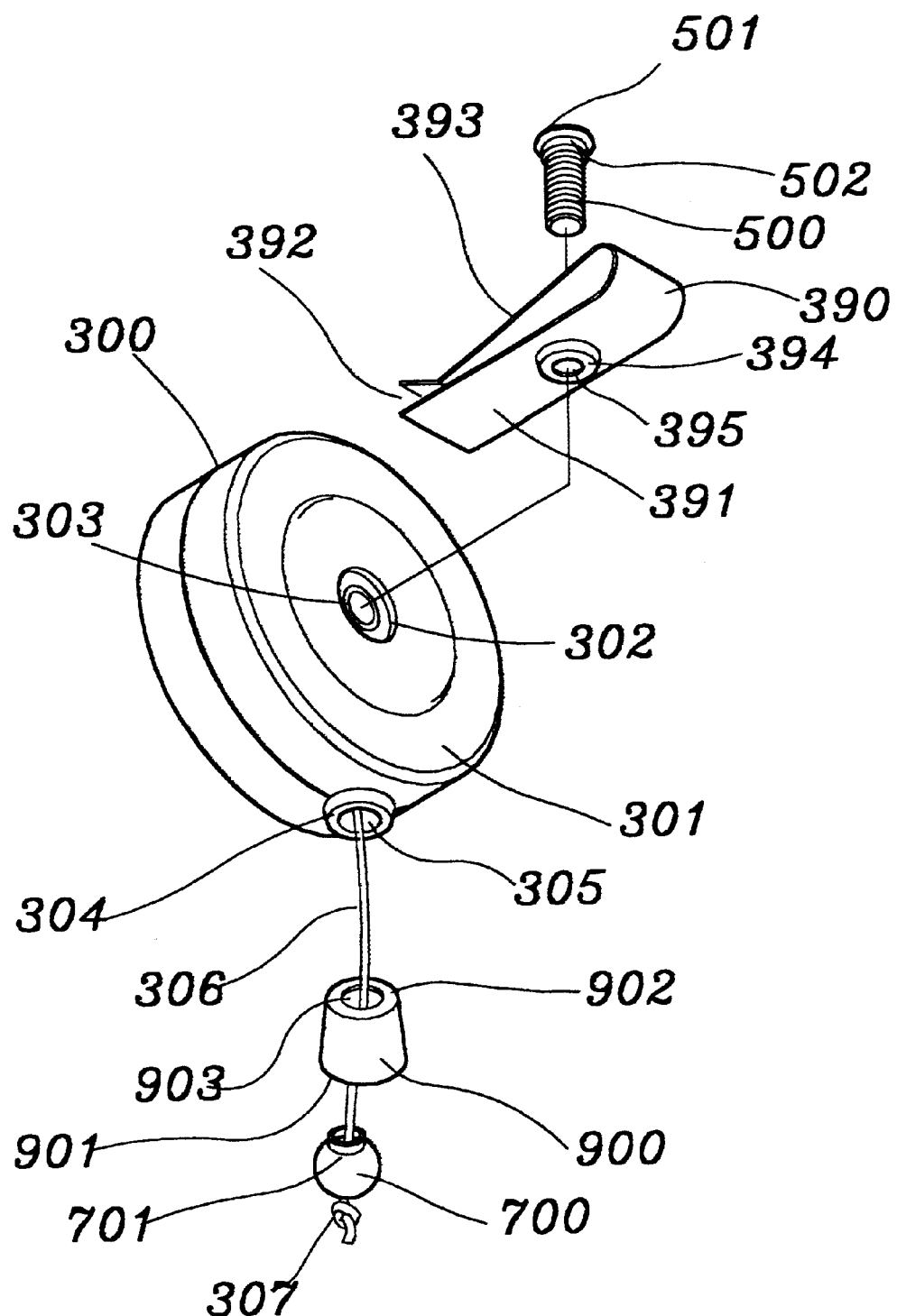
FIG. 11 is an analytic perspective view showing the elements of the embodiment shown in FIG. 9.
Figure 12:
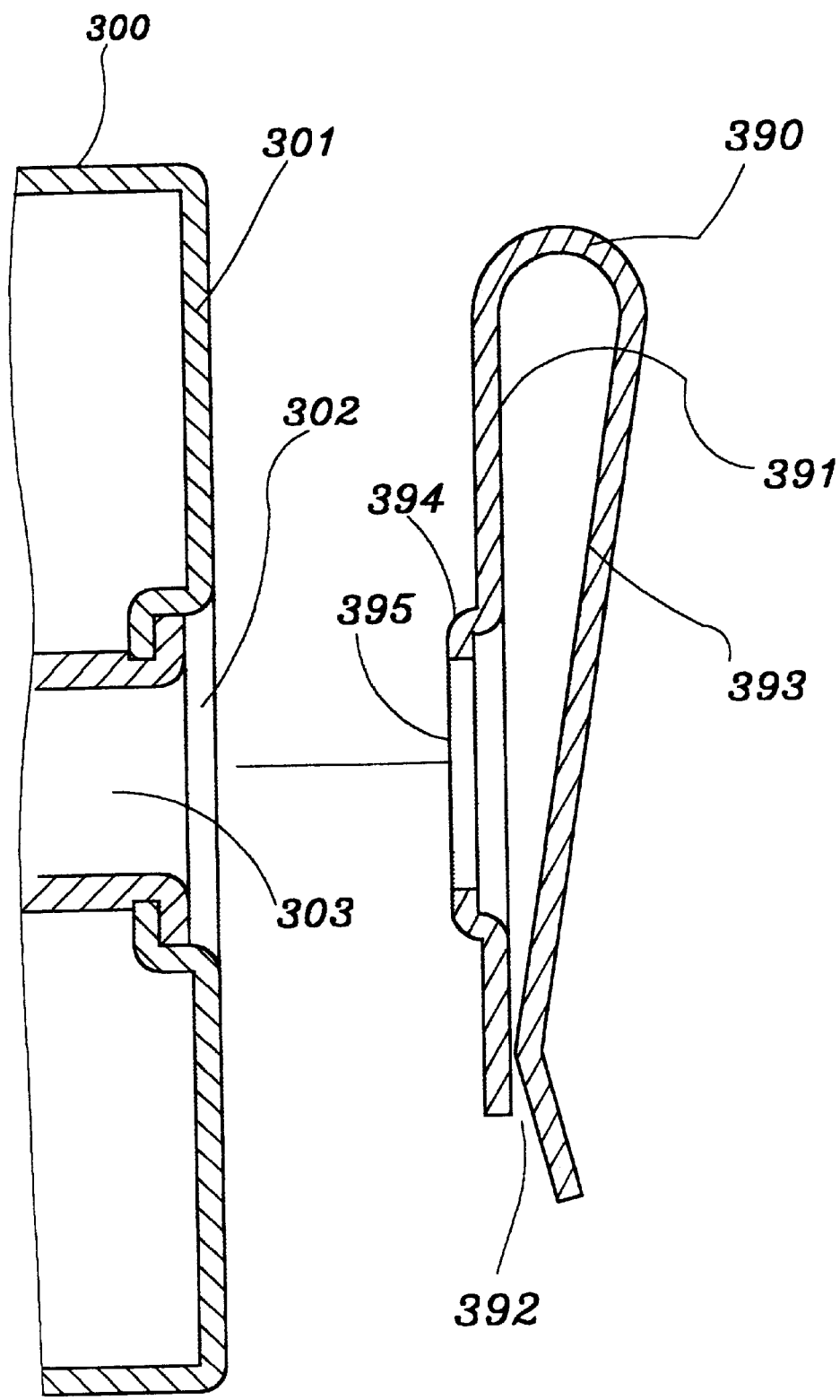
FIG. 12 is a cross sectional view separately showing the reel body and the clamp of the embodiment shown in FIG. 11.

As shown in FIG. 11 and 12, the clamp 390 includes a flat portion 391 and a clamping portion 393 forming a mouth 392 with the flat portion 391. The flat portion 391 is punching molded to form a protruding annulus 394 with a hole 395 therein. A concave portion 302 is provided centrally of the side 301 having the clamp 390 on the reel body. The diameter of the concave portion 302 is slightly larger than that of the protruding annulus 394. And the concave portion 302 is provided centrally thereof with an axle hole 303. The protruding annulus 394 of the clamp 390 thereby can be aligned with and fitted in the concave portion 302 and is locked in the axle hole 303 with a connecting member such as a bolt or rivet 500 extending through the hole 395 of the clamp 390. A neck portion 502 with a diameter slightly smaller than that of the hole 395 is provided at the junction of the shank and the head 501 of the bolt 500. The neck portion 502 can allow motion of the clamp 390 after the bolt 500 is locked in position. The neck portion 502 is formed integrally with the shank as is depicted in the drawing, and can be alternatively provided with a collar of suitable diameter and thickness slipped over the junction area. In the preferred embodiment shown, the bolt 500 is connected by screw thread; but a rivet can also be used for connecting. The neck portion of the rivet can also be formed integrally with the shank thereof or can be alternatively provided with a collar of suitable diameter and thickness slipped over the junction area.

Figure 14:
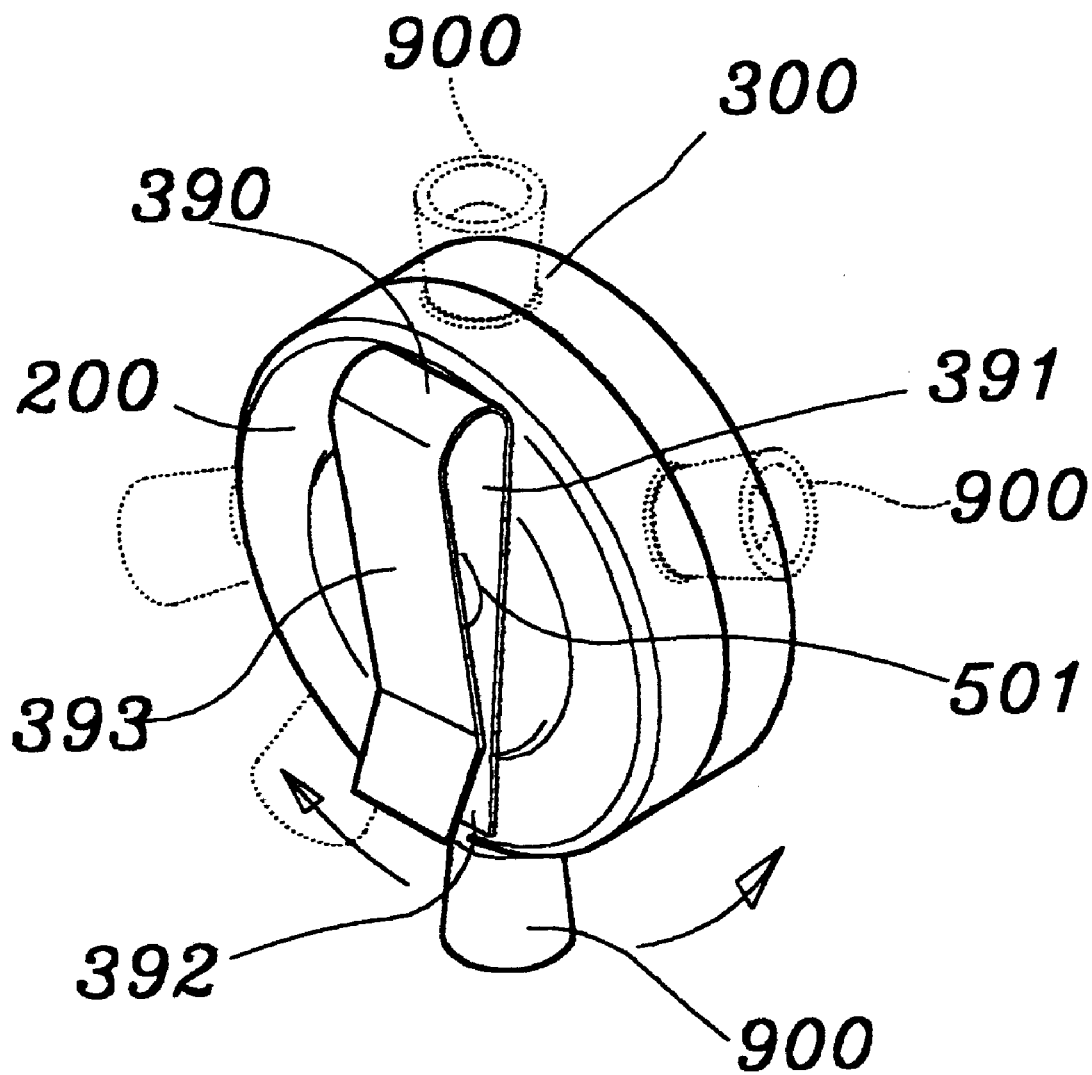
FIG. 14 is a schematic perspective view showing independent rotating of the reel body relative to the clamp of the embodiment shown in FIG. 10.

The ways of connection of the bolt 500 can make movable combination of the clamp 390 and the reel body, so that when the clamp 390 is hung on some place, the whole reel body can be rotated in the angular area of 360 degrees (as shown in FIG. 14). The head 501 of the bolt 500 is embedded and positioned in a hole provided in the protruding annulus 394.

As shown in FIG. 11, the reel body is provided on the periphery thereof with a sleeve 304 with a rope hole 305, an internal pulling rope 306 can be pulled out or reeled back into the rope hole 305. The pulling control member 900 is conventionally in the shape of a truncated hollow cone and includes a lower open side 901 and a top plane surface 902 having thereon a top hole 903. The pulling control member 900 is loaded therein with a ball 700 having a diameter slightly larger than that of the top hole 903 The ball 700 is provided with a hole for extending therethrough the pulling rope 306, and is preferably provided with a protruding top annulus 701.

The pulling rope 306 can be extended through the top hole 903 on the pulling control member 900 and the hole of the ball 700 and then can be made at the end thereof a tie 307 to be received in the hollow ball 700 and stuck with the hole.

Figure 13:
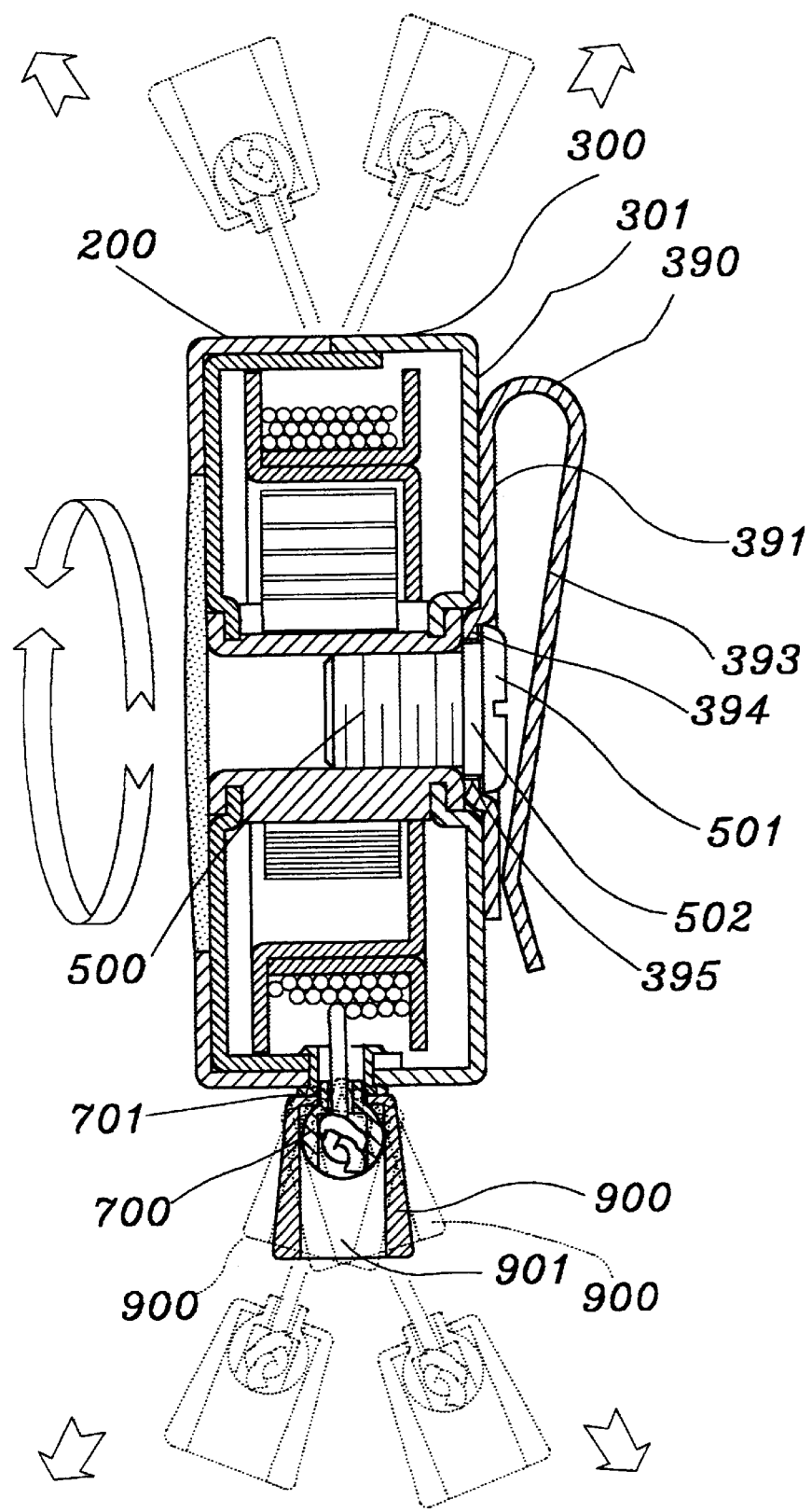
FIG. 13 is a schematic sectional view showing action of the pulling control member of the embodiment shown in FIG. 10.

The pulling rope 306 connects the spring in the reel body, a spring force pulls the ball 700 to abut against the top hole 903 on the pulling control member 900. When the whole pulling control member 900 is pulled outwardly, the ball 700 at the end of the pulling rope 306 bears the acting force when it contacts the top hole 903 on the pulling control member 900. The ball 700 functioning as a fulcrum allows convenient rope pulling in any orientation (as shown in FIG. 13). When the ball 700 is received in position, part of its surface is exposed to the exterior of the top hole 903. So that when pulling force is removed, the whole pulling control member 900 and the ball 700 are pulled upwardly very fast toward the rope hole 305 of the sleeve 304. The partially exposed ball 700 thus is pulled toward the exit of the rope hole 305, and the whole pulling control member 900 is accurately reeled back to its original position. The protruding top annulus 701 on the top of the ball 700 functions as a protecting member to prevent the pulling control member 900 (when being pulled out in an orientation having overly large angle with the vertical direction) from damaging the deviated pulling rope 306 at the location where it contacts the top hole 903 on the pulling control member 900.

Figure 15:
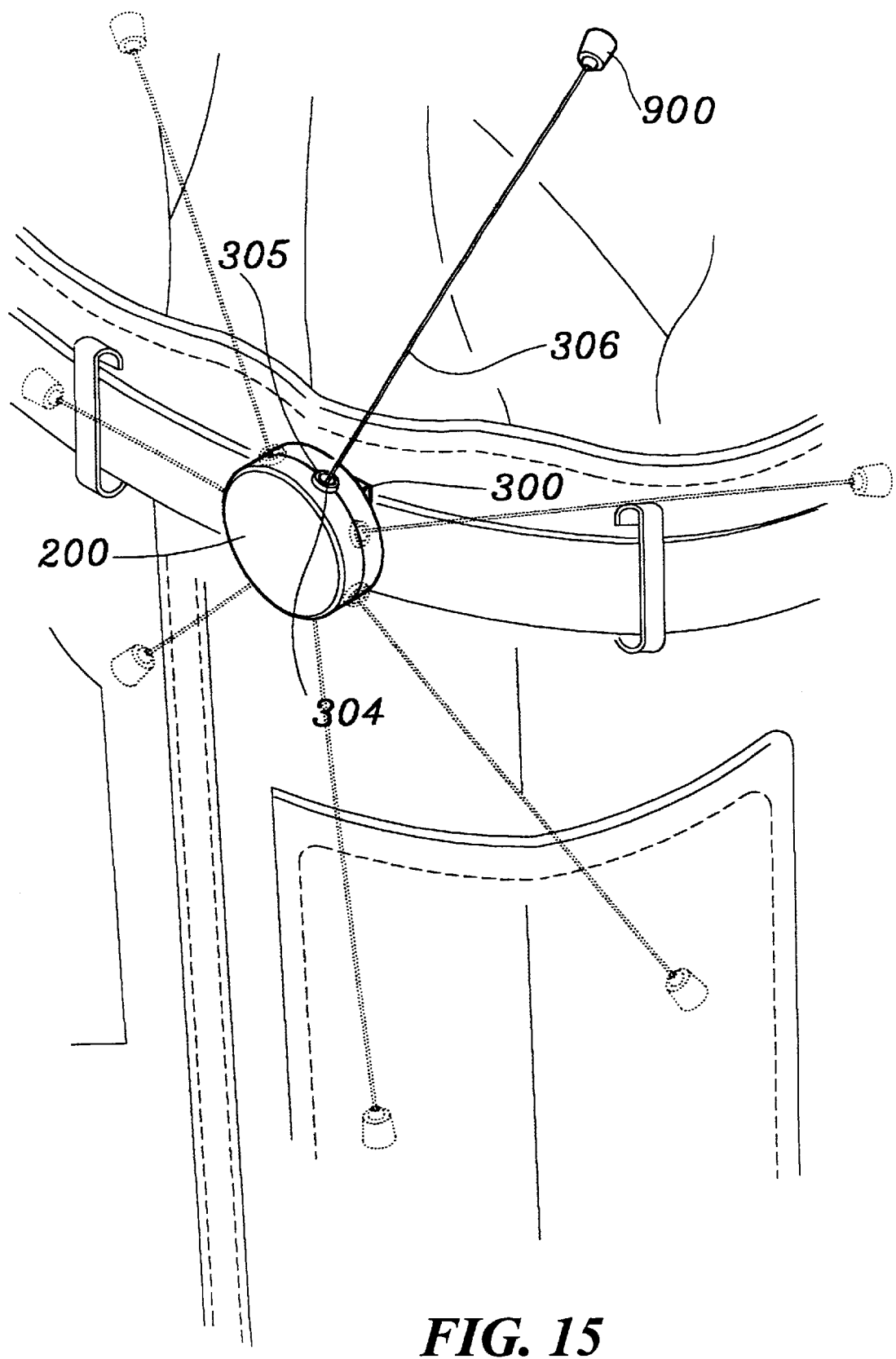
FIG. 15 is a schematic perspective view showing hanging by clamping of the present invention.

Referring to FIGS. 13, 14 and 15, wherein the reel of the present invention is hung by clamping on a waist belt of a person, the reel body can be smoothly rotated in the whole angular area of 360 degrees around the central reel axle. Therefore, the pulling control member 900 can be pulled out at any orientation, this is quite convenient for use. The pulling rope 307 thus can be pulled out at any orientation without worry of frictional damage, and when pulling force is removed, it can be accurately reeled back to its original position. The central reel axle of the reel body is the rotation axis and force bearing point regardless of the orientation in which the pulling rope 306 is pulled out, thus, the clamp 390 can be stably hung in position without being influenced by the pulling force.

Figure 16:
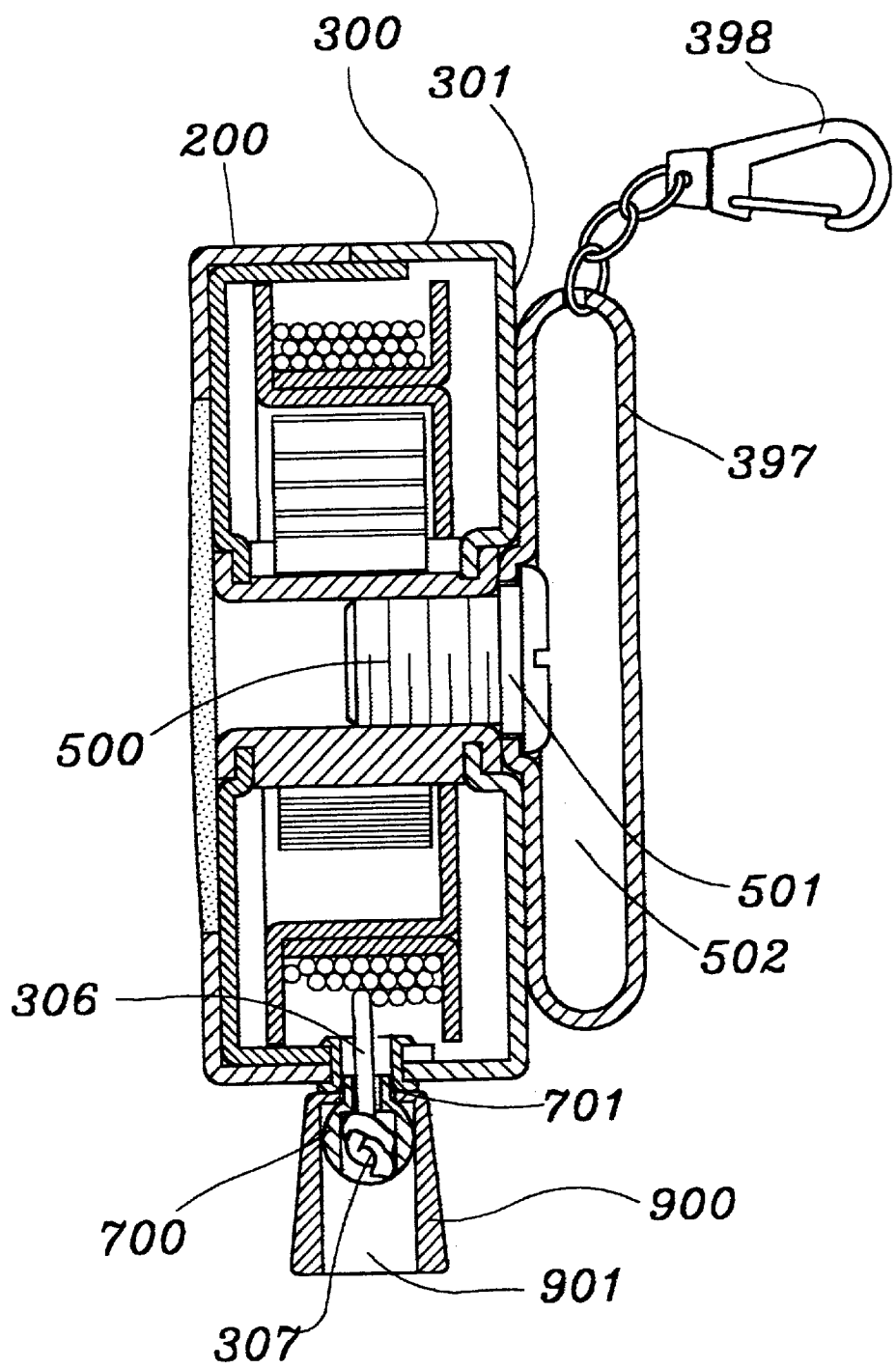
FIG. 16 is a sectional view of another embodiment of the present invention.

In another embodiment of the present invention shown in FIG. 16, a close typed clamp 397 having a hole on one side is used, it can be more stably slipped over a waist belt. In either of the embodiments, a hanging hook 398 can be provided on the top of the clamp 390 or 397, in order that the whole reel can be secured on a personal article such as a briefcase.

The improvement of the present invention includes in addition to enlargement of the space of the reel axle for the coil spring and the pulling rope, capability of making various decorative patterns economically on the more plane and neat exterior decorative piece (without any concave annular area). Even the decorative piece can be omitted to still get the apparent decorative function. And the whole reel can allow pulling out of its pulling rope m any orientation, and when pulling force is removed, the pulling rope can be accurately reeled back to its original position without damage or breakage by friction.

Having thus described my invention, what I claim as new and desire to be secured by Letters Patent of the United States are:

1. A rotatable reel carried on one's person comprising:
   a housing having an upper lid and a bottom lid, a male upper cover and a female lower cover are provided in an interior of said housing to form a reel axle to be placed therein a coil spring and a roll of pulling rope, one end of said pulling rope is exposed to an exterior of said housing and has a pulling control member thereon;
   said bottom lid has mounted on an exterior surface thereof a clamp;

a lining sleeve placed in said upper lid, said bottom lid placed over said lining sleeve and abutted on a protruding portion provided on said lining sleeve and connected with said upper lid;

a rivet sleeve extending through central holes of said bottom lid, said reel axle and said lining sleeve and rivet fastened at an end to said lining sleeve; and said upper lid having on an exterior surface thereof, a decorative piece.

2. A rotatable reel carried on one's person as defined in claim 1, wherein, said upper lid is provided on its surface with a hole for receiving said decorative piece.

3. A rotatable reel carried on one's person as defined in claim 1, wherein, a pad is sandwiched between said upper lid and said lining sleeve, said pad is exposed to the exterior through said hole for receiving said decorative piece.

4. A rotatable reel carried on one's person as defined in claim 1, wherein, said male upper cover is provided with a peripheral upper ring and a hollow connecting bowl, a receiving space is formed in said hollow connecting bowl; while said female lower cover is correspondingly provided with a lower peripheral ring and a fitting-over collar tightly matching with said connecting bowl of said male upper cover; when said connecting bowl and said fitting-over collar are fittingly connected with each other, a space in said male upper cover is adapted to placing therein said coil spring, and said pulling rope is wrapped about said female lower cover.

5. A rotatable reel carried on one's person as defined in claim 1, wherein, an end of said rivet sleeve is used to movably rivet a clamp mounted on one side of said bottom lid with a rivet at a concave area.

6. A rotatable reel carried on one's person as defined in claim 1, wherein, a clamp on one side of said bottom lid is punching molded to form a protruding annulus with a hole therein, a concave portion is provided centrally of a side on the reel, said protruding annulus is aligned with and fitted in said concave portion and is locked in an axle hole provided centrally of said concave portion with a connecting member, said pulling control member includes a top plane surface having thereon a top hole, said pulling control member is loaded therein with a ball to abut against an inner surface of said pulling control member, said ball is partially exposed to the exterior through said top hole; a pulling rope is extended through a rope hole of a sleeve provided on the periphery of said reel body, and said top hole on said pulling control member and a hole of said ball, and then is made at the end thereof a tie to be positioned in said ball.

7. A rotatable reel carried on one's person as defined in claim 6, wherein, a neck portion is provided at a junction of a shank and a head of said connecting member extending in said hole of said protruding annulus of said clamp.

8. A rotatable reel carried on one's person as defined in claim 7, wherein, said neck portion of said connecting member is formed integrally with said shank.

9. A rotatable reel carried on one's person as defined in claim 7, wherein;

said neck portion of said connecting member is provided with a collar slipped over said junction.

10. A rotatable reel carried on one's person as defined in claim 6, wherein, said connecting member is a rivet, extending in said hole of said protruding annulus of said clamp.

11. A rotatable reel carried on one's person as defined in claim 10, wherein, a neck portion is formed integrally with said shank.

12. A rotatable reel carried on one's person as defined in claim 10, wherein, a neck portion of said connecting member is provided with a collar slipped over a junction of a shank and a head.

13. A rotatable reel carried on one's person comprising:

a housing having an upper lid and a bottom lid, said bottom lid has on an exterior surface thereof a clamp, a pulling control member located exteriorly of a periphery of said reel; a clamp includes a flat portion abutting on said bottom lid and a clamping portion, said flat portion is provided centrally with a protruding annulus, said protruding annulus is fitted in a concave portion with a connecting member in order that said reel can be rotated 360 degrees.

14. A rotatable reel carried on one's person as defined in claim 13, wherein, said clamp is provided with a hole on said protruding annulus, said concave portion provided centrally of the side having said clamp on said reel body is provided centrally thereof with an axle hole, said connecting member is extended and locked into said axle hole through said hole of said protruding annulus.

15. A rotatable reel carried on one's person as defined in claim 14, wherein, said connecting member is a bolt, having a neck portion provided at a junction of a shank and a head of said bolt.

16. A rotatable reel carried on one's person as defined in claim 15, wherein, said neck portion is formed integrally with said shank.

17. A rotatable reel carried on one's person as defined in claim 15, wherein, said neck portion of said connecting member is provided with a collar slipped over said junction.

18. A rotatable reel carried on one's person as defined in claim 13, wherein, said clamp is a close typed clamp having a hole on one side thereof.

19. A rotatable reel carried on one's person as defined in claim 13 wherein, a hanging hook is provided on the top of said clamp.

* * * * *